(12) United States Patent
Ohba et al.

(10) Patent No.: US 6,524,519 B1
(45) Date of Patent: Feb. 25, 2003

(54) METHOD OF MOLDING ELASTIC DOLL HEADS AND MOLD THEREFOR

(75) Inventors: Kazuo Ohba, Saitama (JP); Takahiro Ueno, Chiba (JP)

(73) Assignee: Takara Co., Ltd., Tokoyo (JP)

( * ) Notice: Subject to any disclaimer, the term of this patent is extended or adjusted under 35 U.S.C. 154(b) by 0 days.

(21) Appl. No.: 09/600,746

(22) PCT Filed: Nov. 29, 1999

(86) PCT No.: PCT/JP99/06652
§ 371 (c)(1),
(2), (4) Date: Jul. 20, 2000

(87) PCT Pub. No.: WO00/32288
PCT Pub. Date: Jun. 8, 2000

(30) Foreign Application Priority Data

Dec. 1, 1998 (JP) ............................................. 10-342205

(51) Int. Cl.⁷ .............................................. B29C 49/62
(52) U.S. Cl. ........................ 264/534; 264/55; 264/523; 425/522; 425/812
(58) Field of Search ................ 264/534, 535, 264/523, 536; 425/522, 812

(56) References Cited

U.S. PATENT DOCUMENTS 3,015,856 A * 1/1962 Cohn ........................... 249/160
4,143,453 A * 3/1979 Taluba ......................... 264/295
5,935,620 A * 8/1999 Baudin ......................... 425/522

FOREIGN PATENT DOCUMENTS

JP 10192556 A * 7/1998

* cited by examiner

Primary Examiner—Suzanne E. McDowell (57) ABSTRACT

A molding method and a mold therefor capable of forming a doll head of a shape exactly conforming to a mold by blow molding using a safe molding material. A split mold (2, 3) which has an inner surface formed to have a configuration conforming to a shape of a doll head (17) is so arranged that a parting line (18) formed by mold members (2, 3) of the split mold may be formed on a hairline of the hair of the doll head (17) or in proximity thereto. A molding material is constituted by a thermoplastic synthetic resin elastomer as a main ingredient thereof and has a plasticizer and a coloring agent added thereto. The molding material is heated and then dropped in as a parison (15) between the mold members (2, 3) of the split mold spaced from each other. Then, the mold members (2, 3) of the split mold are joined together and air is blown into the split mold. Air is removed through at least one projection such as a nose (5) or the like from a cavity during blowing of air into the split mold (2, 3).

19 Claims, 5 Drawing Sheets

METHOD OF MOLDING ELASTIC DOLL HEADS AND MOLD THEREFOR

TECHNICAL FIELD

This invention relates to a method for molding an elastic head for a doll and a mold therefor.

BACKGROUND ART

Conventionally, an elastic head for a doll has been generally formed of molten vinyl chloride by slush molding or rotational molding. Both slush molding and rotational molding prevent formation of such a parting line as seen in a molded doll head made by blow molding, to thereby provide a molded article satisfactorily finished. Also, rotational molding has the advantage of enabling mass production of the head at a low cost.

Vinyl chloride contains chlorine and the above-described molding techniques require to adding phthalate ester to act as a plasticizer to vinyl chloride in order to provide a molded article with elasticity or resiliency. Recently, safety of vinyl chloride and phthalate ester has been considered to be problematic, thus, use of vinyl chloride tends to be avoided in various fields. This is likewise true of a doll head, thus, it is required that the head be formed of a safe molding material.

However, molding of a molding material other than vinyl chloride by slush molding or rotational molding is substantially impossible because the material fails to be gelled. Blow molding permits molding of the material, however, it fails to prevent formation of a parting line on a surface of a molded head. Also, it fails to permit the molding material to be satisfactorily distributed to fine uneven portions such as eyes of the doll head, its nose, its mouth and the like, so that there is a possibility of failing to mold the head exactly in conformity to a configuration of a mold. In manufacturing of a doll head, satisfactory finishing of a surface of a face of the head such as increased smoothness of the surface and enhanced elaborateness of unevenness of various parts of the face are absolute requirements. The conventional blow molding techniques fully fail to meet both requirements.

Also, a head for a doll is required to exhibit elasticity which permits the head to have a soft feel like the human skin. Thus, the head must meet such a requirement.

The present invention has been made so as to solve the above-described problem of the prior art. Accordingly, it is an object of the present invention to provide a method for forming a doll head and a mold therefor which is capable of employing a molding material other than vinyl chloride and forming the head for exactly conforming or corresponding to a configuration of a mold by blow molding as well as permitting the doll head to exhibit elasticity.

DISCLOSURE OF INVENTION

In order to solve the above-described problem of the prior art, in accordance with the present invention, a method for molding a head for a doll is provided. The method is characterized in that the method comprises the steps of: providing a split mold having an inner surface formed to have a configuration conforming to a shape of the head of the doll, the split mold having a parting line formed on a hairline of the hair of the head or in proximity thereto; heating a parison constituted by a molding material which mainly consists of one of a thermoplastic synthetic resin elastomer and silicone resin and which has a plasticizer and a coloring agent added thereto, dropping in the parison between mold members of the split mold kept spaced from each other, then joining the mold members of the split mold together, and blowing air into the split mold thus joined; removing air from a cavity defined in the split mold through at least one of projections formed on the inner surface of the split mold when air is blown into the split mold; and separating the mold members of the split mold from each other to remove a molded article therefrom.

Such construction of the method of the present invention effectively prevents the parting line from appearing on a face which is the most important portion of the doll head. The parting line is defined on a hairline of the hair of the head or in proximity thereto. The head is covered with hair embedded on the head or a wig, so that the parting line may be prevented from being viewed from the outside or outwardly exposed. In the prior art, a post-treatment of a parting line formed on an elastic molded article is manually carried out, resulting in the molding being highly troublesome. The present invention eliminates such a troublesome treatment, so that the head may be manufactured with increased efficiency.

Further, in the present invention, air is removed from the cavity in the split mold through an air vent hole formed in at least one of the projections, such as a nose or the like, of the split mold substantially concurrently with blowing of air which is carried out during the molding, to thereby ensure that the molding material is satisfactorily fed or distributed to the projections. Thus, portions of the head corresponding to the projections are each permitted to be formed to have a distinct shape exactly conforming to a configuration of the mold.

In addition, the molding material is constituted by a synthetic resin elastomer or silicone resin, resulting in it being free of vinyl chloride, so that the present invention may provide a non-toxic and safe doll head which does not lead to environmental pollution and which is harmless to health of the human body. Also, the doll head is permitted to exhibit elasticity and have a soft feel like the human skin, resulting in a doll particularly suitably used as an instrument which permits infants and children to gain pseudo-experience in play being provided.

Moreover, the molded article is elastic, to thereby be readily smoothly removed from the mold, resulting in damages to undercuts of the head such as a nose, a chin or the like being prevented.

It is preferable that the split mold be formed at a portion thereof corresponding to a neck of the doll with a rod so as to be retractably advanced into the cavity, so that the rod is advanced into the cavity after blowing air and is retracted or retreated from the cavity before the mold members of the split mold are separated from each other, resulting in a neck hole being formed. Such construction prevents the neck hole from damaging the remaining part of the head, because the neck hole is by advancing the rod into the cavity of the split mold after air is blown into the cavity during the molding to expand the parison.

Removal of air from the cavity is desirably carried out through a fine air vent hole formed through the projection of the split mold. Alternatively, removal of air from the cavity may be carried out via a bar-like porous element inserted through the split mold.

In accordance with another aspect of the present invention, a mold for molding a head for a doll is provided. The mold is characterized in that the mold comprises: two split mold members of which one has an inner surface formed to have a configuration conforming to a shape of a face of the doll and the other has an inner surface formed to have a configuration conforming to a shape of a rear and side head portion of the doll, the split mold members having a parting line formed on a hairline of the hair of the head or in proximity thereto; one of the split mold members being formed at at least one of projections provided on the inner surface with an air vent means which permits air in a cavity in the split mold members to be removed therethrough when air is blown into the split mold members.

The mold thus constructed positively realizes satisfactory practicing of the above-described molding method by blow molding, so that a doll head may be formed to have a sharp configuration substantially equal to that conventionally obtained by slush molding or rotating molding. Also, one of the split mold members has the inner surface formed to have a configuration conforming to the shape of the face of the doll and the other mold member has the inner surface formed to have a configuration conforming to the shape of the rear and side head portion of the doll. This prevents a parting line from appearing on the face which is the most important portion of the doll head.

The split mold members preferably have a rod for formation of a neck hole arranged at a portion thereof corresponding to a neck of the doll in a manner to be retractably advanced into the cavity. The arrangement of the rod ensures formation of the neck hole without damaging the remaining part of the doll head. Also, the rod is preferably formed on a peripheral surface of a distal end thereof with a ring-like groove. The ring-like groove thus formed permits a peripheral surface of the neck hole of the molded doll head to be formed with an annular projection, which effectively functions to prevent a neck portion of a body of the doll fitted in the neck hole from being detached from the neck hole.

The air vent means is preferably constituted by an air vent hole formed through the split mold member and the air vent hole is preferably formed to have a diameter of from 0.1 mm to 0.3 mm. Alternatively, the air vent means may be constituted by a bar-like porous element inserted through the split mold member. In this instance, the porous element desirably has pores formed to have a diameter of from 0.03 mm to 0.1 mm. Such construction permits air in the cavity forced out due to expansion of the parison by blowing air during the molding to be naturally removed to the outside from the air vent means, so that the doll head may be formed to have a shape exactly corresponding to the inner configuration of the mold without forcible removal of the air. Also, the air vent hole or pores for air removal are formed to have a sufficiently small diameter, to thereby prevent ingress of the molding material into the air vent hole or pores during the molding, resulting in a trimming operation after the molding being eliminated.

BEST MODES FOR CARRYING OUT INVENTION

Figure 7A:
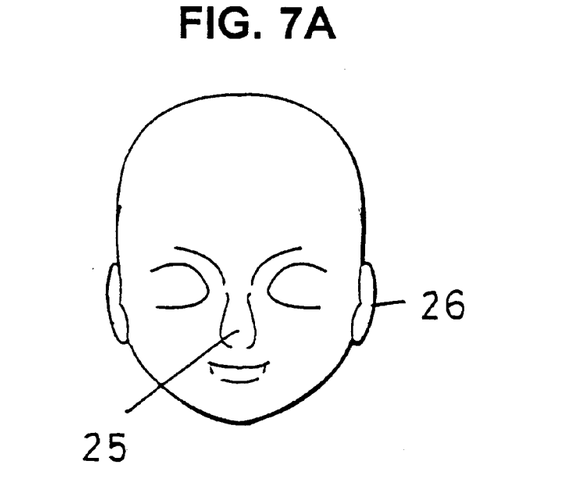
FIG. 7A is a front elevation view showing a doll head formed by blow molding at the experimental stage and FIG. 7B is a side elevation view thereof.
Figure 7B:
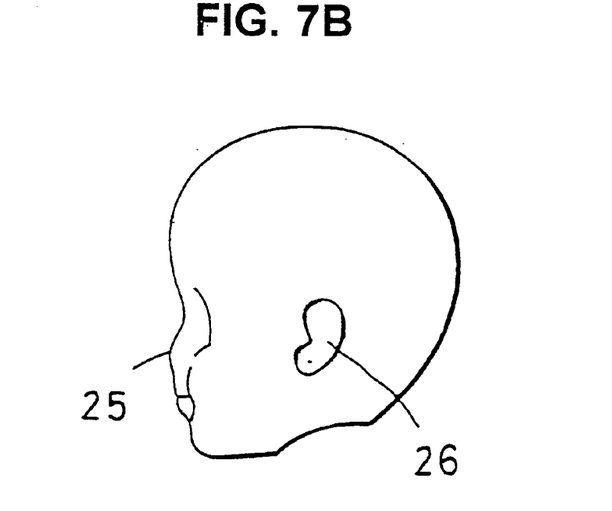

First, a doll head was manufactured by blow molding by way of trial in order to further study the above-described problems encountered in blow molding conventionally carried out. As a result, it was found that blow molding, as shown in FIGS. 7A and 7B, causes a nose 25 and ears 26 to be rounded. In particular, it was found that a configuration of each of a tip of the nose 25 and nares lacks sharpness, thus, blow molding causes a problem of failing to permit a molding material to be fully distributed throughout a mold. Also, it was found that a whole surface of a doll head is not necessarily exposed and a parting line may be disregarded by adopting a suitable measure.

The inventors have developed a method for molding a doll head by blow molding and a mold for practicing the method while taking notice of the above-described fact. The details thereof will be described hereinafter.

Figure 1:
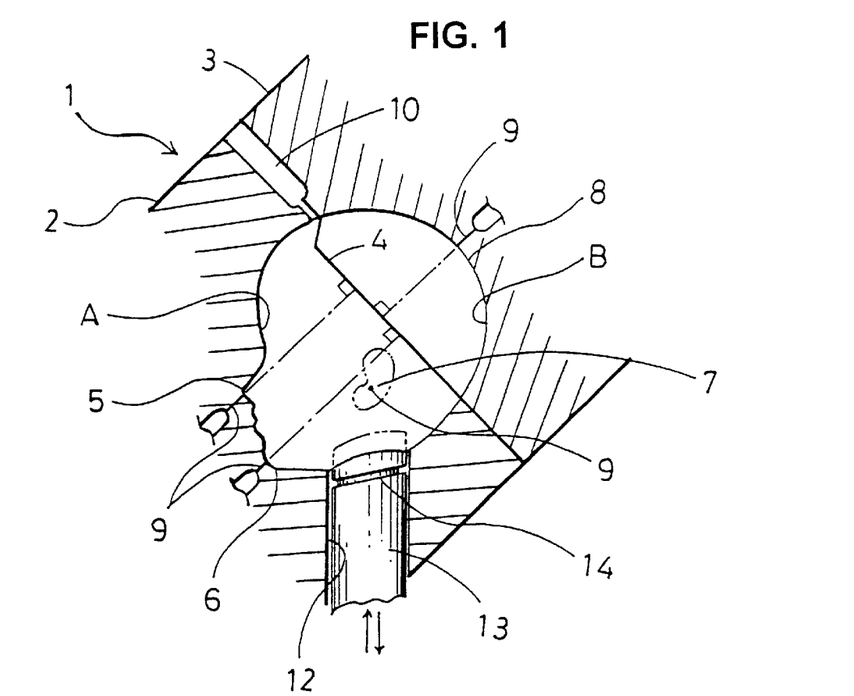
FIG. 1 is a sectional view showing an embodiment of a mold for molding a doll head according to the present invention.

In FIG. 1, reference numeral 1 designates a mold. The mold 1 is applied to blow molding and constituted by two split mold members 2 and 3. One of the split mold members 2 has an inner surface formed to have a configuration A conforming or corresponding to a face of a doll and the other split mold member 3 has an inner surface formed to have a configuration B conforming or corresponding to a portion of a head of the doll other than the face. The term "portion of head other than face" used herein indicates a portion of the head including a vertex, an occiput and a part of a temple and is referred to as "rear and side head portion" herein. Also, the split mold members 2 and 3 are so constructed that a mating surface 4 is defined on a hairline of the hair on the doll head or in proximity thereto so as to prevent a parting line from appearing on the face of the doll. The split mold members 2 and 3 are provided with projections constituting a nose 5, a chin 6, ears 7 and an occiput 8, respectively. The projections are each formed therein with an air vent hole 9. The air vent hole 9 is preferably formed to have a diameter of between 0.1 mm and 0.3 mm. The air vent holes 9 in the nose 5, chin 6 and occiput 8 are each formed so as to be perpendicular to the mating surface 4 of the split mold members 2 and 3. Also, the air vent hole 9 in each of the ears 7 is formed so as to be perpendicular to a surface (not shown) which is defined at a center as viewed from a front. An air blowing hole 10 is formed at a portion of the mating surface 4 positioned at an uppermost portion of the head.

In the illustrated embodiment, the air vent holes 9 for air removal are provided in the projections of the split mold members 2 and 3. However, it is merely required that the air vent hole 9 be provided on at least one location. In general, the air vent holes are preferably provided in the nose 5 and ears 7. In particular, the air vent hole 9 is more preferably arranged in the nose 5, although it is not limited to such arrangement. The term "projections" used herein indicate not only portions outwardly projecting from a surface of the head such as the nose 5, chin 6 and ears 7 but non-recessed portions or outwardly convex portions such as lips, cheeks, a forehead and the like. Thus, the projections further include portions positioned away from the mating surface 4 of the split mold members 2 and 3, which portions permit air to be apt remain therein, such as portions of the occiput 8 and chin 6 at which the air vent holes 9 are arranged.

Also, the one split mold member 2 described above is formed in a portion thereof corresponding to a neck of the doll with a through-hole 12, which has a rod 13 slidably arranged therein so as to be retractably advanced into a cavity of the mold 1. The rod 13 is formed on a peripheral surface of a distal end thereof with a ring-like groove 14. The rod 13 may be arranged so as to be actuated through any suitable means (not shown) such as an air cylinder unit, a hydraulic cylinder unit or the like arranged outside the mold 1.

Now, manufacturing of the doll head by the mold 1 thus constructed will be described.

First of all, a molding material is provided, which mainly consists of a thermoplastic synthetic resin elastomer because the doll head which is a molded article is required to exhibit soft elasticity like the human skin. The molding material also contains a plasticizer, a coloring agent and the like added to the elastomer. The thermoplastic elastomers include an olefin elastomer, a styrene elastomer, a styrene-butadiene elastomer, an urethane elastomer, a polyester elastomer, a polyethylene elastomer and the like. Such a thermoplastic elastomer is kept from such gelation as encountered in vinyl chloride when a plasticizer is added thereto, but can be used as a molding material for blow molding. Also, such a thermoplastic elastomer permits a variety of plasticizers to be used for the molding material. Thus, the present invention excludes incorporation of any chlorine elastomer into the molding material. Also, the present invention keeps phthalate ester from being used as a plasticizer for the molding material. In the illustrated embodiment, a material which is commercially available under a tradename "Septone" from KURARAY CO., LTD. may be used as the molding material. In addition to the elastomer described above, silicone resin may be used as the molding material.

Figure 2:
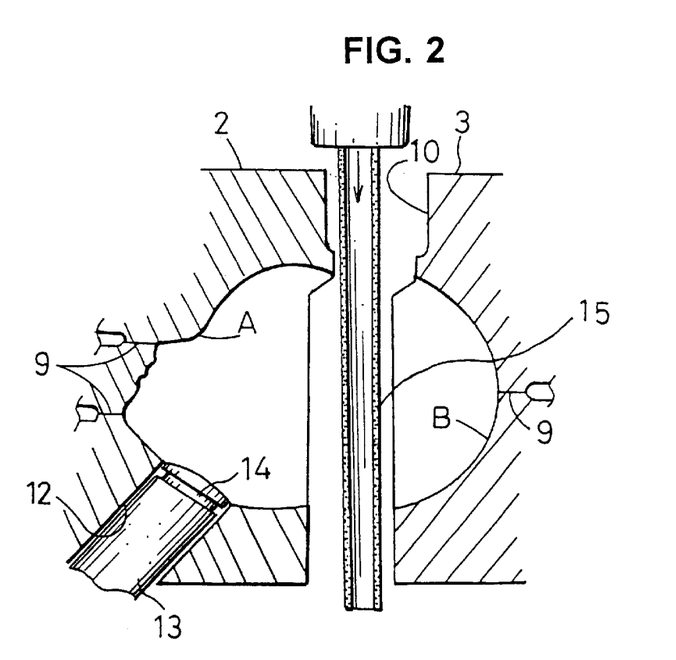
FIG. 2 is a sectional view showing the mold kept open in a molding method according to the present invention.
Figure 3:
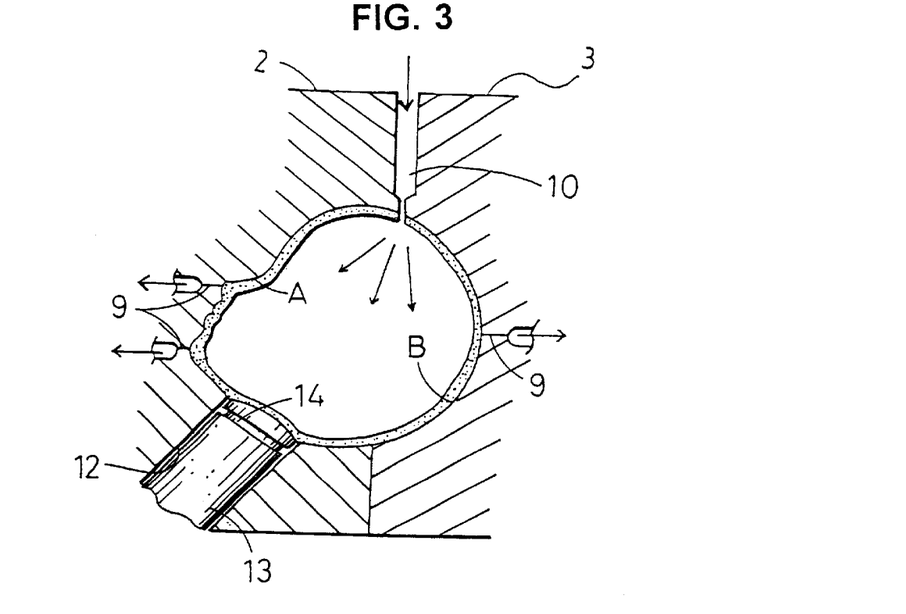
FIG. 3 is a sectional view showing the mold having air blown thereinto.

Then, a cylindrical parison 15 formed of the above-described molding material is heated and then dropped in between the split mold members 2 and 3 arranged so as to be spaced from each other as shown in FIG. 2. Then, as shown in FIG. 3, the split mold members 2 and 3 are joined to each other and then air is blown into the thus-joined split mold members 2 and 3 through the air blowing hole 10.

The molding material is heated to a temperature of between 210° C. and 220° C. and the above-described blowing of air is carried out under a pressure of between 4 kgf/cm$^2$ and 6 kgf/cm$^2$. The blowing of air permits expansion of the parison 15, so that the parison 15 may be stuck on the inner surfaces of the split mold members 2 and 3. The heating temperature of between 210° C. and 220° C. to which the molding material is heated permits the parison 15 to be uniformly expanded. Air initially present in the cavity partially remains between the parison 15 and the inner surfaces of the split mold members 2 and 3. Thus, the residual air is outwardly removed through the air vent holes 9 substantially concurrently with the blowing air described above. This prevents the residual air from forming a kind of a wall, to thereby ensure that the molding material is satisfactorily distributed throughout the inner surface of the mold 1.

Figure 4:
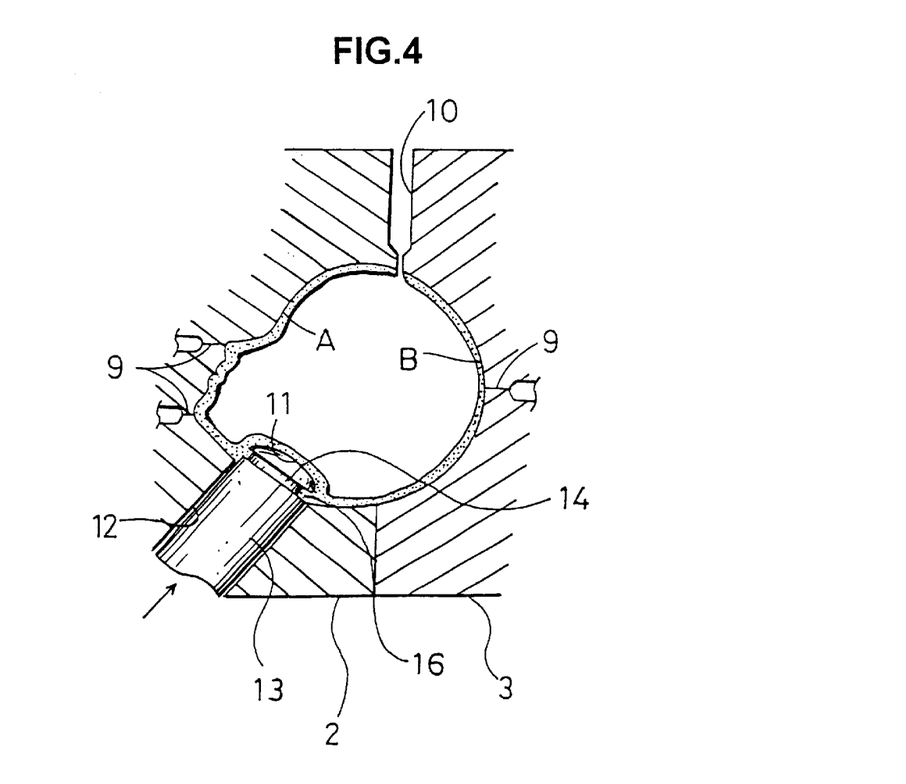
FIG. 4 is a sectional view showing formation of a neck hole.

Then, as shown in FIG. 4, the rod 13 is advanced into the cavity after blowing air and then the rod 13 is retracted or retreated from the mold 1 before the split mold members 2 and 3 are released or separated from each other. Ingress or advancing of the rod 13 into the cavity permits the molding material in the split mold member 2 to be partially pushed into the interior of the split mold member 2, resulting in a neck hole 11 being formed. When the rod 13 is then retreated from the cavity, a projected ring 16 is formed on a peripheral surface of the neck hole 11.

Figure 5A:
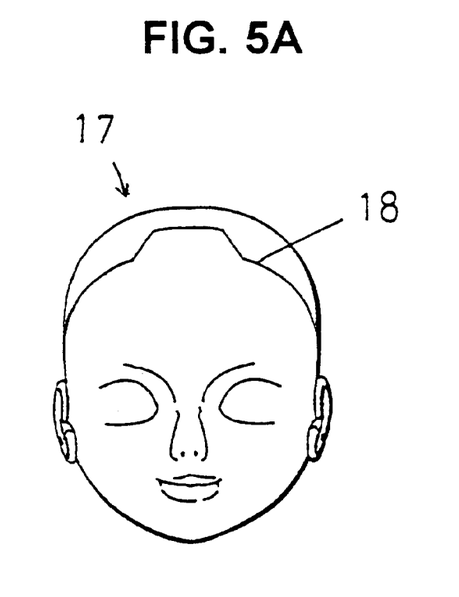
FIG. 5A is a front elevation view showing a molded doll head and FIG. 5B is a side elevation view thereof.
Figure 5B:
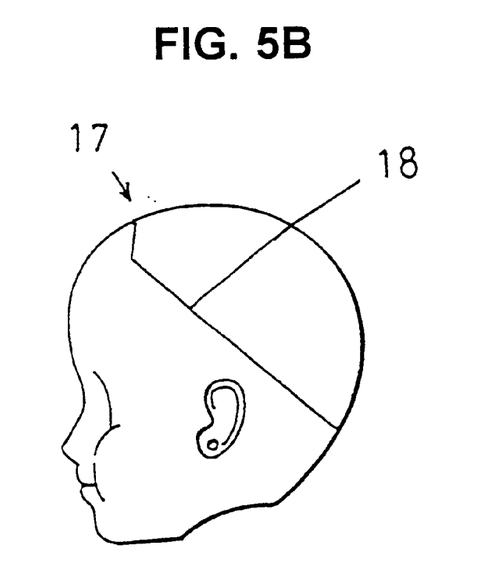

When the split mold members 2 and 3 are separated from each other after retreat of the rod 13 from the cavity, a molded article is removed from the split mold members 2 and 3, to thereby drop, so that an elastic head 17 for a doll as shown in FIGS. 5A and 5B may be obtained. In this instance, a parting line 18 is defined along a hairline of the hair as shown in FIGS. 5A and 5B.

Thus, the doll head molding method described above prevents the parting line from appearing on the face of the doll head which is the most important portion of the doll head 17 because the one split mold member 2 is formed on the inner surface thereof with a configuration conforming to the face of the doll and the other split mold member 3 is formed on the inner surface thereof with a configuration conforming to the rear and side head portion of the head.

The parting line 18 is formed on the portion of the doll head in proximity to the hairline of the hair. However, the rear and side head portion of the doll head is covered with hair embedded on the head or a wig, to thereby keep the parting line 18 from being exposed at a position which is visible from outside. This eliminates a necessity of subjecting the parting line 18 to any post-treatment and renders the parting line 18 negligible.

Air is removed from the split mold members 2 and 3 through the air vent holes 9 formed in the portions thereof corresponding to the nose 5, chin 6, ears 7 and occiput 8 of the doll head substantially simultaneously with blowing air during the molding, to thereby ensure that the molding material may be satisfactorily distributed to these portions. This permits the doll head molded to have a tip of a nose, nares and conchae each of which is formed to have a sharp configuration in exact conformity to a configuration of the mold. In addition, the air vent holes 9 are each formed to have a diameter as small as 0.1 mm to 0.3 mm which fully prevents the molding material from entering the air vent holes 9, resulting in the molded article or doll head being kept from being formed thereon with any unnecessary portion like a whisker. Thus, the illustrated embodiment eliminates a post-treatment of trimming or removing any unnecessary fine portion. For manufacturing of a doll head of about 40 mm in height and about 30 mm in width, the air vent holes 9 are each most preferably formed to have a diameter of about 0.2 mm. The unnecessary portion having a size of 0.3 mm or more facilitates the post-treatment; so that when a doll head increased in size is to be molded, the air vent holes 9 may be formed to have a diameter larger than 3 mm, to thereby form a large unnecessary portion, which is then readily removed or trimmed.

Most of the air vent holes 9 are formed so as to be perpendicular to the mating surface 4 of the split mold members 2 and 3, resulting in removal of air from the mold 1 being efficiently carried out. However, the present invention is not limited to such a configuration.

The illustrated embodiment is so constructed that the rod 13 is moved via the cylindrical through-hole 12 of the split mold member 2 after expansion of the parison 15 by blowing air during the molding, to thereby form the neck hole 11. Such construction effectively prevents the neck hole 11 from damaging or interfering with forming of the remaining part of the doll head. On the contrary, the molding carried out while keeping the rod 13 initially projected into the cavity of the mold 1 possibly causes the rod 13 to interfere with distribution of the molding material throughout the mold, to thereby prevent the molding material from being fully distributed to portions corresponding to a chin of the doll head and the like.

The rod 13, as described above, is formed on the peripheral surface of the distal end thereof with the ring-like groove 14, to thereby permit the annular projection 16 to be formed on the peripheral surface of the neck hole 11 of the doll head 17. Such construction, when a neck portion formed on the body of the doll is fitted in the neck hole 11, prevents the neck portion from being detached from the neck hole 11. The term "ring-like" used in connection with the ring-like groove 14 covers "helical".

Figure 6:
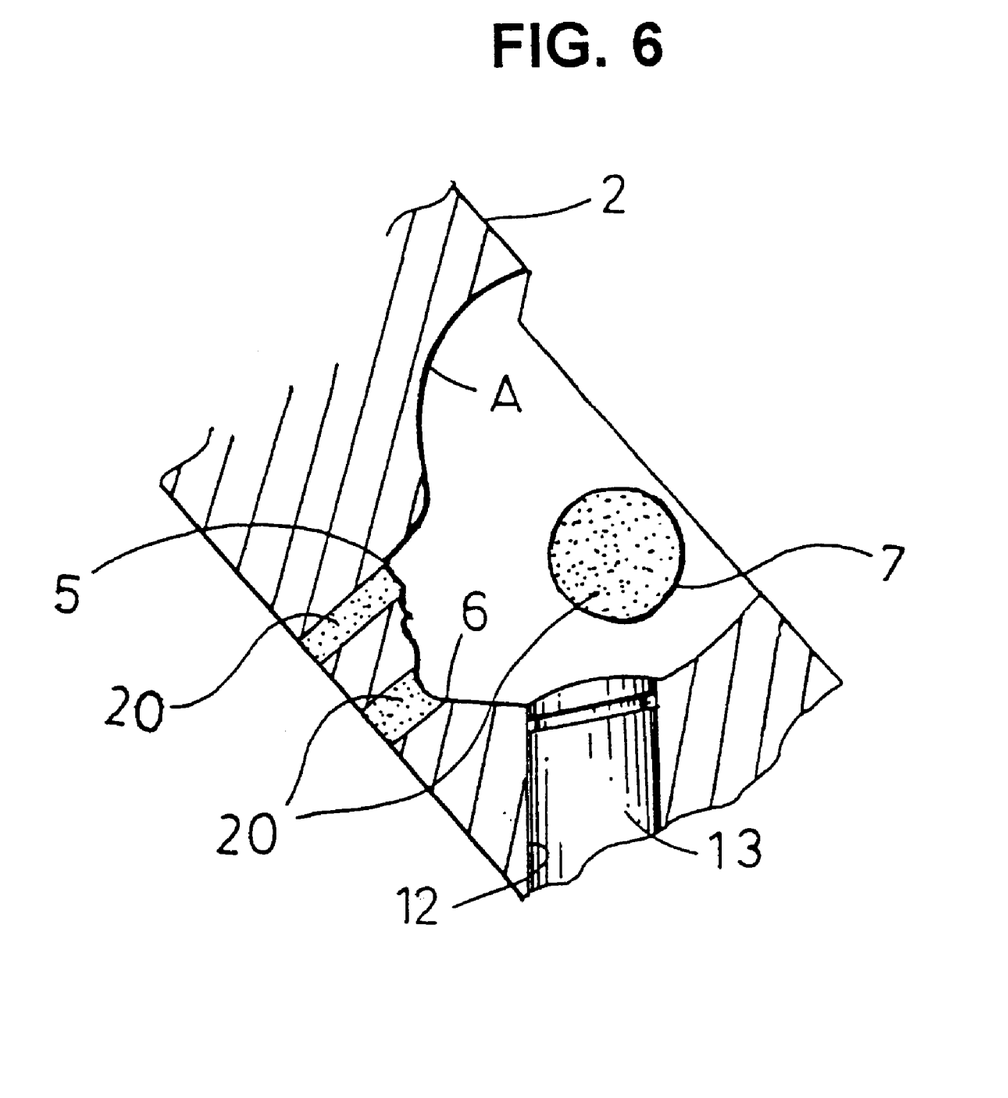
FIG. 6 is a sectional view showing another embodiment of a mold for molding a doll head according to the present invention.

Removal of residual air from the cavity of the mold is not limited to that carried out through the fine air vent holes 9 formed through the split mold members 2 and 3. More specifically, as shown in FIG. 6, the illustrated embodiment may be constructed in such a manner that bar-like porous elements 20 are arranged so as to be inserted through the split mold member 2(3) and have end surfaces thereof, which face the cavity, formed to have the respective shapes corresponding to the nose 5 and ears 7. The porous elements 20 each preferably have pores formed to have a diameter within a range of between 0.03 mm and 0.1 mm.

The above-described construction of the illustrated embodiment permits air forced out due to expansion of the parison 15 by blowing air during the molding to be naturally discharged through the porous elements 20 to the outside, to thereby prevent formation of a wall by residual air, so that a molded article or doll head which is formed to have a configuration exactly conforming to the mold and exhibits sufficient elasticity may be obtained. Alternatively, the residual air may be forcibly evacuated from the cavity through the porous elements 20.

What is claimed is:

1. A method for molding an elastic head for a doll, characterized in that the method comprises the steps of:
   providing a split mold having an inner surface formed to have a configuration conforming to a shape of the head of the doll, said split mold having a parting line formed on a hairline of the hair of the head or in proximity thereto;
   heating a parison constituted by a molding material which mainly consists of one of a thermoplastic synthetic resin elastomer and silicone resin and which has a plasticizer and a coloring agent added thereto, dropping in the parison between mold members of said split mold kept spaced from each other, then joining said mold members of said split mold together, and blowing air into said split mold thus joined;
   removing air from a cavity defined in said split mold through at least one of projections formed on said inner surface of said split mold when air is blown into said split mold; and
   separating said mold members of said split mold from each other to remove a molded article therefrom.

2. A method for molding an elastic head for a doll as defined in claim 1, wherein said split mold is provided at a portion thereof corresponding to a neck of the doll with a rod so as to be retractably advanced into said cavity, further comprising the steps of advancing said rod into said cavity after blowing air and retracting said rod from said cavity before said mold members of said split mold are separated from each other, resulting in a neck hole being formed.

3. A method for molding an elastic head for a doll as defined in claim 2, wherein the removing of air from said cavity is carried out through a fine air vent hole formed through the projection of said split mold.

4. A method for molding an elastic head for a doll as defined in claim 2, wherein the removing of air from said cavity is carried out through a bar-like porous element inserted.

5. A method for molding an elastic head for a doll as defined in claim 1, wherein the removing of air from said cavity is carried out through a fine air vent hole formed through the projection of said split mold.

6. A method for molding an elastic head for a doll as defined in claim 1, wherein the removing of air from said cavity is carried out through a bar-like porous element inserted through said split mold.

7. A mold for molding an elastic head for a doll, characterized in that the mold comprises:
   two split mold members of which one has an inner surface formed to have a configuration conforming to a shape of a face of the doll and the other has an inner surface formed to have a configuration conforming to a shape of a rear and side head portion of the doll, said split mold members having a parting line formed on a hairline of the hair of the head or in proximity thereto;
   one of said split mold members being formed at at least one of projections provided on said inner surface with an air vent means which permits air in a cavity in said split mold members to be removed therethrough when air is blown into said split mold members.

8. A mold for molding an elastic head for a doll as defined in claim 7, wherein said split mold members have a rod for formation of a neck hole arranged at a portion thereof corresponding to a neck of the doll in a manner to be retractably advanced into said cavity.

9. A mold for molding an elastic head for a doll as defined in claim 8, wherein said rod is formed on a peripheral surface of a distal end thereof with a ring-like groove.

10. A mold for molding an elastic head for a doll as defined in claim 8, wherein said air vent means is constituted by an air vent hole formed through the split mold member.

11. A mold for molding an elastic head for a doll as defined in claim 10, wherein said air vent hole is formed to have a diameter of from 0.1 mm to 0.3 mm.

12. A mold for molding an elastic head for a doll as defined in claim 8, wherein said air vent means is constituted by an air vent hole formed through the split mold member.

13. A mold for molding an elastic head for a doll as defined in claim 8, wherein said air vent means is constituted by a bar-like porous element inserted through the split mold member.

14. A mold for molding an elastic head for a doll as defined in claim 7, wherein said air vent means is constituted by a bar-like porous element inserted through the split mold member.

15. A mold for molding an elastic head for a doll as defined in claim 14, wherein said porous element has pores formed to have a diameter of from 0.03 mm to 0.1 mm.

16. A method for molding a hollow elastic structure of a doll head comprising:
   providing a mold unit having a first mold member with an inner surface configured to replicate a face of the doll head and a second mold member with an inner surface configured to replicate a rear head portion of the doll head;
   separating the first and second mold members to define a mold part line that would be complimentary to the hairline of the doll head;
   inserting a parison of molding material that is devoid of either vinyl chloride and phthalate ester between the first and second mold members;
   closing the first and second mold members around the parison;
   heating the parison;

exerting an air pressure within the closed first and second mold member to force the parison to conform to the inner surfaces of the first and second mold member;

exhausting residual air from the closed mold member through at least one vent hole positioned at a concave inner surface of a mold member having a size characteristic of the vent hole which prevents the molding material from entering the vent hole;

separating the first and second mold members; and removing the molded doll head.

17. The method of claim 16 wherein the vent hole diameter is within a range of 0.1 mm to 0.3 mm.

18. The method of claim 17 wherein the parison is heated to a temperature between 210° C. and 220° C. and the air pressure exerted is between 4 kgf/cm$^2$ and 6 kgf/cm$^2$.

19. The method of claim 16 wherein one of the mold members includes a porous element having a plurality of vent holes with diameters within a range of 0.03 mm to 0.1 mm.

* * * * *